United States Patent Office 3,493,623
Patented Feb. 3, 1970

3,493,623
SYNTHESIS OF BRANCHED CHAIN ALKENOLS
Gottfried J. Brendel, Baton Rouge, La., assignor to Ethyl Corporation, New York, N.Y., a corporation of Virginia
No Drawing. Continuation-in-part of application Ser. No. 498,119, Oct. 19, 1965. This application July 30, 1968, Ser. No. 748,613
Int. Cl. C07c 29/00, 33/02
U.S. Cl. 260—632
10 Claims

ABSTRACT OF THE DISCLOSURE

Branched chain alkenols are prepared by hydrolyzing an intermediate formed by reaction among aluminum, tetrahydrofuran or an alkyl substituted tetrahydrofuran, a hydrocarbyl aluminum hydride (e.g., diisobutyl aluminum hydride), and a conjugated diene (e.g., isoprene). The resultant alkenols have utility as perfumes, monomers, chemical intermediates, and surface active agents.

---

This application is a continuation-in-part of my prior co-pending application Ser. No. 498,119 filed Oct. 19, 1965 and now abandoned.

This invention relates to the synthesis of branched chain ethylenically unsaturated alcohols or alkenols.

This invention provides a novel and efficacious process for producing many rare, and in some cases unique, branched chain aliphatic monohydric alcohols containing olefinic unsaturation in the molecule. This is readily accomplished by effecting reaction among aluminum, tetrahydrofuran or an alkyl substituted tetrahydrofuran, a hydrocarbyl aluminum hydride and a diene utilizing time-temperature-pressure relationships sufficient to effect the desired interaction. Thereupon the intermediate product so formed is subjected to aqueous hydrolysis yielding an organic product from which the desired alkenol(s) can be readily isolated.

Aluminum-containing reaction products are prepared by effecting reaction at an elevated temperature in a system composed of aluminum, tetrahydrofuran or an alkyl substituted tetrahydrofuran, a hydrocarbyl aluminum hydride and a diene. This is a complex condensation reaction which involves, in part, cleavage of the ring of the ether reactant. Although the optimum temperatures, pressures and reaction times will vary to some extent, depending upon the identity of the specific reactants, temperatures in the range of from about 80° C. to about 200° C., pressures in the range of from about 120 to about 250 p.s.i.g. and reaction times ranging up to about 6 hours are generally suitable. It is preferred though not essential to conduct the reaction in a closed reactor under essentially autogenous pressure. The resultant aluminum-containing products are normally solids or solidifiable liquids and oftentimes are soluble to varying degrees in common organic solvents such as tetrahydrofuran.

The aluminum used in the foregoing process may be in the form of chips, turnings, powder or other similar particulated states. It is definitely preferable to employ activated aluminum. Methods for producing suitable activated aluminum are standard and well known in the art. For example, suitably activated aluminum for use in this process may be prepared as described in U.S. 2,885,314, Canadian 707,778, British 788,619 and Canadian 673,753.

Cycloparaffinic monoethers suitable for this process are polymethylene oxides having a five-membered ring. Tetrahydrofuran (tetramethylene oxide) and alkyl substituted tetrahydrofurans are exemplary. On the basis of reactivity, availability, cost, and usefulness of end product, tetrahydrofuran is the preferred ether reactant.

The hydrocarbyl aluminum hydride reactant used in the process may be a dihydrocarbyl aluminum hydride ($R_2AlH$) in which the R groups are hydrocarbyl groups (alkyl, aryl, cycloalkyl, alkenyl, aralkyl, alkaryl, etc.). It is generally preferable to utilize a dialkylaluminum hydride, especially those having alkyl groups containing up to about 18 carbon atoms.

The diene reactant is preferably a conjugated diene hydrocarbon having 4 to 18 carbon atoms in the molecule, such as butadiene, isoprene, 2,3-dimethylbutadiene-1,3 and the like. However, diene hydrocarbons having additional olefinic unsaturation in the molecule may be successfully used, myrcene being exemplary. Also the diene may be substituted by innocuous radicals, as in the case of chloroprene.

The relative proportions of these reactants do not appear to be critical as long as there is present a sufficient amount of each reactant to participate in the reaction.

Hydrolysis of the resultant aluminum-containing intermediates enables one to prepare in good yield a variety of branched chain alkenols which are of value in the chemical and allied arts, especially in the preparation of perfumes and fragrances. Hydrolysis is readily effected by exposing the intermediate to the action of water and more preferably to aqueous mineral acids such as hydrochloric acid, sulfuric acid, or the like.

This invention and the various embodiments thereof may be further understood by reference to the following illustrative examples.

EXAMPLE I

Into a 250 milliliter autoclave equipped with stirring means were placed approximately 16 grams of aluminum, 50 milliliters of tetrahydrofuran, 50 milliliters of isoprene and 10 milliliters of diisobutylaluminum hydride. The autoclave was sealed and the mixture heated for 1 hour at 140–150° C. On opening the autoclave, it was found to be filled with a solid reaction product. This procedure was thereupon repeated three more times under virtually identical conditions and the products from each of the four runs were combined for further handling. A sample of this solid reaction product was subjected to deuterolysis which resulted in the formation of a carbon-deuterium bond showing that an aluminum-carbon bond was present in the product. The remaining combined solid product was hydrolyzed with dilute hydrochloric acid. Thereupon, 1000 milliliters of toluene was added to the product and the phases were separated. The toluene was then removed from the organic phase leaving approximately 80 grams of an organic product, 90 percent of which was a $C_9$ unsaturated alcohol. Analysis of this $C_9$ alcohol showed it to contain approximately 80 weight percent of 5,6-dimethyl-6-hepten-1-ol:

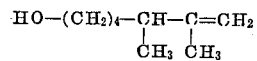

and 20 weight percent of 5,5-dimethyl-6-hepten-1-ol:

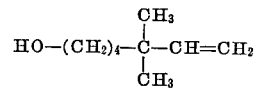

The results in Example I indicate that the use of an asymmetrical diene gives rise to the formation of two isomeric forms of the branched chain alkenol, the identity of the isomer depending on which of the two double bonds participates in the reaction.

Examples II and III illustrates the use of a large excess of the ether reactant, in these instances a solution of the initial reaction product being formed.

EXAMPLE II

Approximately 10 grams of aluminum, 15 milliliters of isoprene, 10 milliliters of diisobutyl aluminum hydride and 100 milliliters of tetrahydrofuran were charged into the autoclave and the contents of the sealed reactor were stirred for one hour at 140 to 150° C. On opening the autoclave the system was found to be a slurry of unreacted aluminum in an homogenous organic phase. The alumium was separated by filtration, the organic phase subjected to hydrolysis conditions (dilute HCl) and thereupon hexane was added as an extractive solvent. The hexane solution was isolated and the hexane removed therefrom by vacuum distillation leaving 8.2 grams of 90 percent pure $C_9$ unsaturated alcohol corresponding in makeup to the alcohol product of Example I. The yield of alcohol was approximately 90 percent based on the hydride atom of the diisobutyl aluminum hydride reactant, and 39 percent based on the quantity of isoprene charged into the autoclave.

EXAMPLE III

The procedure of Example II was repeated with the exception that the quantity of diisobutyl aluminum hydride reactant was 20 milliliters. In this instance the yield of the alcohol product was 77 percent based on the hydride atom of the diisobutyl aluminum hydride reactant, and 58 percent based on the isoprene reactant.

EXAMPLE IV

Sealed in the autoclave were 50 milliliters of tetrahydrofuran, 24 grams of butadiene, approximately 10 grams of particulate, activated aluminum and 15 milliliters of diisobutyl aluminum hydride. The mixture was heated for five hours at 140 to 150° C. under essentially autogeneous pressure. The cooled reaction mixture was poured from the autoclave and found to solidify on standing. Tetrahydrofuran was added to the solids in an amount sufficient to provide a slurry, 0.5 liter in volume. This system was stirred for one hour during which time all of the solids (except for the residual aluminum) went into solution. The resultant system was filtered so as to remove this aluminum. A 150 milliliter portion of this solution was agitated with dilute hydrochloric acid and then 100 milliliters of hexane were added. The phases were separated and the hexane solvent removed from the organic phase by vacuum distillation. The organic product remaining in the distillation flask was subjected to NMR and IR analyses which showed the compounds to be a $C_8$ unsaturated alcohol, viz. 5-methyl-6-hepten-1-ol:

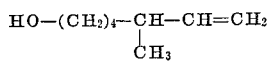

VPC analyses showed this alcohol to have a purity of at least about 70 percent.

EXAMPLE V

The procedure of Example IV was repeated with the exception that the reaction time was one hour instead of five hours. In this case the yield of the ultimate alcohol product was 7 percent. Deuterolysis of a sample of the initial reaction product resulting in the formation of a carbon-deuterium bond indicating that the intermediate contained a carbon-alumium bond.

The results of Examples IV and V indicate that the use of a symmetrical diene results in the formation of a single alkenol product.

EXAMPLE VI

A system composed of 30 milliliters of myrcene, 50 milliliters of tetrahydrofuran, approximately 10 grams of activated aluminum and 10 milliliters of diisobutyl aluminum hydride was sealed in the autoclave and heated at 140 to 150° C. for one hour. The unreacted aluminum was separated from the product by filtration and the organic phase was subjected to hydrolysis. The organic product was then isolated and partially purified by distillation yielding approximately 7 grams of a mixture containing approximately 50 percent unreacted myrcene. NMR, IR, and VPC analyses of this product showed the presence therein of the $C_{14}$ unsaturated alcohols, 5-methyl-6-(4-methyl-3-pentenyl)-6-hepten-1-ol and 5,9-dimethyl-5-vinyl-8-decen-1-ol.

Because of their fragrance characteristics many of the branched chain alkenols formed via the hydrolysis reaction are of utility as perfumes, especially in connection with household detergents, shampoos, toilet bars and the like. Other utilities for these alkenols include their use as monomers, intermediates for the synthesis of polyfunctional molecules (branched chain glycols, etc.) and as surface active agents.

I claim:
1. A process of preparing branched chain alkenols which comprises (a) reacting aluminum, a cycloparaffinic monoether selected from the group consisting of tetrahydrofuran and alkyl substituted tetrahydrofurans, a hydrocarbyl aluminum hydride and a conjugated diene selected from the group consisting of conjugated diene hydrocarbons having 4 to 18 carbon atoms, myrcene and chloroprene at an elevated temperature within the range of from about 80 to about 200° C. to form an intermediate condensation reaction product through cleavage of the ring of said monoether, and (b) hydrolyzing the reaction product.
2. The process of claim 1 wherein the reaction of (a) is effected in a closed reactor and under essentially autogenous pressure.
3. The process of claim 1 wherein the aluminum is activated aluminum.
4. The process of claim 1 wherein the conjugated diene is butadiene, isoprene, or myrcene.
5. The process of claim 1 wherein said monoether is tetrahydrofuran.
6. The process of claim 1 wherein the hydrocarbyl aluminum hydride is a dialkylaluminum hydride.
7. The process of claim 1 wherein the hydrocarbyl aluminum hydride is diisobutylaluminum hydride.
8. The process of claim 1 wherein the conjugated diene is a conjugated diene hydrocarbon having 4 to about 18 carbon atoms in the molecule.
9. The process of claim 1 wherein the aluminum is particulate, activated aluminum; said monoether is tetrahydrofuran; the hydrocarbyl aluminum hydride is diisobutyl aluminum hydride; and the conjugated diene is butadiene, isoprene, or myrcene.
10. The process of claim 1 wherein the reaction of (a) is effected in a closed reactor at a temperature in the range of from about 80° C. to about 200° C. and under essentially autogenous pressure.

References Cited

UNITED STATES PATENTS

| | | |
|---|---|---|
| 2,826,598 | 3/1958 | Ziegler et al. |
| 2,885,314 | 5/1959 | Redman. |
| 2,943,102 | 6/1960 | Balhoff. |
| 3,024,287 | 3/1962 | Kennedy et al. |
| 3,035,077 | 5/1962 | Johnson et al. |
| 3,062,856 | 11/1962 | D'Alelio. |
| 3,091,627 | 5/1963 | Rudner. |
| 3,112,336 | 11/1963 | Kollonitsch. |
| 3,238,237 | 3/1966 | Bedoit. |
| 3,282,974 | 11/1966 | Bruno et al. |

FOREIGN PATENTS

| | | |
|---|---|---|
| 1,266,861 | 6/1961 | France. |
| 251,971 | 3/1963 | Australia. |

LEON ZITVER, Primary Examiner

JOSEPH E. EVANS, Assistant Examiner

U.S. Cl. X.R.

252—89, 522; 260—448, 633, 635